United States Patent Office 2,950,306
Patented Aug. 23, 1960

2,950,306

ORGANO-FLUORINE COMPOUNDS OF PHOSPHORUS ARSENIC AND ANTIMONY

William Channing Smith, Wilmington, Del., assignor to E. I. du Pont de Nemours and Company, Wilmington, Del., a corporation of Delaware No Drawing. Filed Mar. 7, 1957, Ser. No. 644,475

7 Claims. (Cl. 260—440)

This invention relates to a new process of preparing fluorine compounds and to new compositions of matter obtained thereby. More particularly it relates to a method of preparing fluorine compounds of phosphorus, arsenic and antimony and to new compounds formed by this process.

Organic fluorine compounds have achieved considerable technical importance in recent years in the fields of refrigerants, polymers, and as reactive intermediates in the manufacture of new and useful compounds. Their preparation is frequently difficult and costly and in many cases desirable organic fluorine compounds are not obtainable through known routes. This is particularly true of compounds containing fluorine bonded to phosphorus, arsenic or antimony. The present invention provides a simple method which uses available or easily prepared materials for the preparation of these types of compounds.

It is an object of this invention to provide a method for making compounds containing an organic moiety and fluorine bonded to phosphorus, arsenic or antimony. More particularly this invention provides a new method of preparing organic phosphorus, arsenic and antimony oxyfluorides and tetrafluorides. A further object is the preparation of certain new fluorine containing compounds which find utility as polymerization catalysts. These and other objects will become apparent in the light of the following disclosure.

The process comprises reacting sulfur tetrafluoride with an acid of the general structure $RM(O)(OH)_2$ where R is an organic radical such as aliphatic, cycloaliphatic, aryl and aralkyl which can have substituents that are free of active hydrogen as determined by the Zerewitinoff test. More specifically, R can be alkyl, haloalkyl, alkenyl, cycloalkyl, halocycloalkyl, aryl or haloaryl. Examples of such groups are hexyl, octyl, cyclopentyl, cyclohexyl, methacryl, chloroethyl, trifluoropropyl, 2,5-dichlorocyclohexyl, phenyl, benzyl, p-xylyl, chlorophenyl and naphthyl. Preferably R is a hydrocarbon or halohydrocarbon of not more than 12 carbon atoms. M is phosphorus, arsenic or antimony. The reaction proceeds according to the following equations:

$$RM(O)(OH)_2 + 2SF_4 \rightarrow RM(O)F_2 + 2SOF_2 + 2HF \quad (1)$$

$$RM(O)F_2 + SF_4 \rightarrow RMF_4 + SOF_2 \quad (2)$$

If the reaction is conducted in one step it is represented by the following equation:

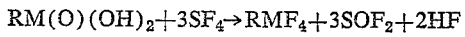

$$RM(O)(OH)_2 + 3SF_4 \rightarrow RMF_4 + 3SOF_2 + 2HF$$

The reaction is conducted by simple mixing and agitation of the components in a closed vessel under autogenous pressure at a temperature high enough to effect the desired reaction. The reaction which is shown in Equation 1 proceeds at a lower temperature than the reaction shown in Equation 2. It is, therefore, possible by suitable selection of reaction temperature and ratio of reactants to obtain either of the two products $RM(O)F_2$ or $RMF_4$.

The temperature at which the reaction is run will be determined not only by the product desired but also by the element which M represents. The highest temperatures are required for phosphorus compounds, lowest temperatures for antimony compounds and intermediate temperatures for arsenic compounds. To illustrate, for phosphorus compounds, reaction temperatures of 80 to 100° C. are optimum for obtaining compounds of the type $RP(O)F_2$; reaction temperatures of 120 to 200° C. are best when compounds of the type $RPF_4$ are desired. To obtain compounds of the type $RAs(O)F_2$ reaction at a lower temperature, for example, 30 to 40° C., will suffice; at 70° C. or higher compounds of the type $RAsF_4$ are obtained. To obtain compounds of the type $RSb(O)F_2$ cooling of the reactants prior to mixing is preferred. It can thus be seen that the temperature of the reaction can range from 0° C. or lower to 200° C., depending on the reactants and on the products desired.

Varying the quantities of the reactants used has a lesser effect on the products obtained than variation in temperature. However, if the product $RM(O)F_2$ is principally desired it is preferable to use an excess of the acid in the reaction, that is, the molar ratio of the acid to sulfur tetrafluoride should be greater than 1 to 2 but will generally not exceed 1 to 1. Similarly if $RMF_4$ is the product principally desired, it is preferable to use the sulfur tetrafluoride in excess, that is, the molar ratio of the acid to sulfur tetrafluoride should be less than 1 to 3 but will generally not be less than 1 to 4.

The reaction should be conducted under anhydrous conditions since both the reactants and the final products react with water. The presence of water will not only produce hydrogen fluoride from the components of the reaction but will also accelerate the corrosive action of the hydrogen fluoride which is already present as a normal by-product of the reaction. The reaction chamber should be lined with a material that is resistant to attack by acid fluorides, for example, platinum or stainless steel.

The reaction is preferably conducted in the absence of oxygen. For this reason the reaction chamber is freed of air and oxygen by flushing with nitrogen or other inert gas followed, optionally, by evacuation to a pressure of 10 mm. or less prior to introduction of the sulfur tetrafluoride.

The reaction may be conducted in the presence of an inert gas, for example, nitrogen or helium. The particular pressures used are not critical. The reaction can be conveniently conducted under autogenous pressure. An appreciable amount of product is formed within an hour but for optimum results the reaction time will generally lie between 5 hours and 24 hours. Longer reaction times are not detrimental.

The compounds otbained by the process of this invention are colorless liquids wihch fume in air. They can be distilled without decomposition and are stable if stored under anhydrous conditions. They react readily with water, alcohols, phenols, mercaptans, amines and other organic compounds which have reactive hydrogen atoms. They are useful, therefore, as intermediates for the preparation of difficultly accessible compounds, for example, esters and amides of arsenic and stibonic acids.

The novel compounds obtained from the process can be described generically as $RM'(O)_xF_{4-x}$ where M' is arsenic or antimony; $x$ is a cardinal number no greater than 1, i.e., $x$ is 0 or 1; R has a significance previously attributed to it. The new compounds of arsenic and antimony are organic arsenic oxyfluorides, organic arsenic tetrafluorides, organic antimony oxyfluorides and organic antimony tetrafluorides. Examples of typical new compounds prepared by the process of this invention are difluoro(methyl)arsine oxide, $CH_3As(O)F_2$; butylarsenic tetrafluoride, $C_4H_9AsF_4$; dodecylarsenic tetrafluoride $C_{12}H_{25}AsF_4$; difluoro(phenyl)stibine oxide $$C_6H_5Sb(O)F_2$$

and ethylantimony tetrafluoride, $C_2H_5SbF_4$.

The following examples illustrate the method of preparing compounds of the invention.

Example I

This example describes the preparation of phenylphosphonic difluoride, $C_6H_5P(O)F_2$, and phenyltetrafluorophosphorane, $C_6H_5PF_4$.

A reaction vessel (capacity 145 milliliters), capable of withstanding pressure and lined with stainless steel, was flushed with nitrogen and then charged with 31.6 g. (0.20 mole) of phenylphosphonic acid. It was then cooled in ice, evacuated to approximately 1 mm. pressure and 33 g. (0.30 mole) of sulfur tetrafluoride added. After being heated for 8 hours at 80° C. with mechanical agitation there was obtained 39.9 g. of liquid product. The liquid product was treated with 20 g. of sodium fluoride suspended in 100 ml. of dry petroleum ether to remove hydrogen fluoride, if present. The solution was filtered and the ether removed by distillation. The liquid residue was then distilled through fractionating column to yield 3.0 g. of phenylphosphonic difluoride, boiling at 172–173° C.

Analysis.—Calc'd for $C_6H_5POF_2$: F, 23.45%. Found: F, 23.83%.

The reaction vessel described above was then charged with 24.3 g. (0.15 mole) of phenylphosphonic difluoride (obtained in several runs) and 33 g. (0.30 mole) of sulfur tetrafluoride. The reaction mass was heated with mechanical agitation at 100° C. for 2 hours and 150° C. for 10 hours. There was obtained 23.0 g. of liquid product which, when fractionally distilled, yielded 17.2 g. of phenyltetrafluorophosphorane, boiling at 134–135° C.

Example II

This example illustrates the preparation of phenyltetrafluorophosphorane, $C_6H_5PF_4$ in one step.

A pressure reaction vessel similar to that used in Example I was charged with 15.0 g. (0.10 mole) of phenylphosphonic acid and 44 g. (0.40 mole) of sulfur tetrafluoride using the procedure described in Example I. The reaction vessel was heated with mechanical shaking at 100° C. for 2 hours, 120° C. for 4 hours and 150° C. for 6 hours. There was obtained 16.1 g. of liquid product and 24 g. of volatile product. The volatile product was shown by mass spectrometric analysis to be principally an expected by-product, thionyl fluoride. The liquid product was treated with 20 g. of anhydrous granular sodium fluoride suspended in 100 ml. of dry petroleum ether. Following filtration and removal of the petroleum ether, the liquid residue was fractionally distilled to yield 5.5 g. of phenyltetrafluorophosphorane boiling at 130–133° C.

Examples I and II illustrate the preparation of arylphosphonic difluorides and aryltetrafluorophosphoranes. Other arylphosphorus fluorides which can be prepared by this method are p-chlorophenylphosphonic difluoride, o-tolylphosphonic difluoride, p-fluorophenyltetrafluorophosphorane p-tolyltetrafluorophosphorane and alpha-naphthylphosphonic difluoride.

Example III

This example describes the preparation of butylphosphonic difluoride.

A reaction vessel similar to that described in Example I was charged with 20.7 g. (0.15 mole) of n-butyl-phosphonic acid and 66 g. (0.60 mole) of sulfur tetrafluoride using the procedure described in Example I. It was heated with mechanical shaking at 80° C. for 6 hours and at 100° C. for 6 hours. There was obtained 20.8 g. of liquid product which, after treatment as in Example I, was distilled under reduced pressure. There was obtained 1.8 g. of butylphosphonic difluoride, a colorless liquid boiling at 68–70° C. under 56 mm. pressure.

Analysis. — Calc'd for $C_4H_9P(O)F_2$: F, 26.80%. Found: F, 28.67%.

Example III illustrates the application of the process to the preparation of alkylphosphonic difluorides. Other compounds which can be prepared are methylphosphonic difluoride from methylphosphonic acid, dodecylphosphonic difluoride from dodecylphosphonic acid, ethyltetrafluorophosphorane from ethylphosphonic acid, octyltetrafluorophosphorane from octylphosphonic acid, octadecyltetrafluorophosphorane from octadecylphosphonic acid, and isooctenyltetrafluorophosphorane from isooctenylphosphonic acid.

Example IV

This example describes the preparation of phenylarsenic tetrafluoride.

A reaction vessel similar to that described in Example I was charged with 30.3 g. (0.15 mole) of phenylarsonic acid and 66 g. (0.60 mole) of sulfur tetrafluoride using the procedure described in Example I. The reaction mass was heated at 70° C. for 10 hours. There was obtained 35.9 g. of liquid product which fumed on exposure to air. It was processed as in Example I. Distillation under reduced pressure yielded 15.5 g. of phenylarsenic tetrafluoride boiling at 52–53° C. at 2 mm. pressure.

Analysis.—Calc'd for $C_6H_5AsF_4$: C, 31.60%; H, 2.21%; F, 33.33%; As, 32.85%. Found: C, 31.91%, 31.53%; H, 2.57%, 2.40%; F, 33.31%, 33.46%; As, 32.45%, 32.37%.

The above example illustrates the preparation of an arsenic polyfluoride. Examples of other compounds which can be prepared are methylarsenic tetrafluoride, $CH_3AsF_4$ from methylarsonic acid, butyldifluoroarsine oxide, $C_4H_9As(O)F_2$ from butylarsonic acid, difluoro(phenyl)arsine oxide, $C_6H_5As(O)F_2$ from phenylarsonic acid, p-tolylarsenic tetrafluoride, $CH_3C_6H_4AsF_4$ from p-tolylarsonic acid, octyldifluoroarsine oxide $$C_8H_{17}As(O)F_2$$

from octylarsonic acid and dodecylarsonic tetrafluoride, $C_{12}H_{25}AsF_4$ from dodecylarsonic acid.

Antimony compounds which can be prepared by the process are difluoro(propyl)stibine oxide [$C_3H_7Sb(O)F_2$] from propylstibonic acid, difluoro(p-tolyl)stibine oxide [$CH_3C_6H_4Sb(O)F_2$] from p-tolylstibonic acid, methylantimony tetrafluoride ($CH_3SbF_4$) from methylstibonic acid, butylantimony tetrafluoride ($C_4H_9SbF_4$) from butylstibonic acid, 2-butenylantimony tetrafluoride ($C_4H_7SbF_4$) from 2-butenylstibonic acid and difluoro(p-chlorophenyl)-stibine oxide [$ClC_6H_4Sb(O)F_2$] from p-chlorophenylstibonic acid.

The compounds of this invention are generically useful as polymerization catalysts, as illustrated in the following examples.

Example A

Forty grams of tetrahydrofuran was placed in a glass-stoppered flask and the flask was then flushed with nitrogen. There was then added 1 g. of phenyltetrafluorophosphorane prepared as in Example II, and the mixture allowed to stand at room temperature. In 30 minutes the reaction mixture had darkened and in one hour it had thickened slightly. After 12 hours, standing at room temperature, the product was hard and somewhat tacky.

Example B

A mixture of 40 ml. of tetrahydrofuran and 1.5 g. of phenylarsenic tetrafluoride was stirred in a glass-stoppered flask at room temperature for 3½ hours. At the end of this period the viscosity of the mixture had increased to the point where it could no longer be stirred. After standing an additional 3½ hours at room temperature the reaction mixture was barely fluid; after 23 hours it was a soft plastic material.

In the examples the fluorination of the organic phosphorus, arsenic and antimony compounds has been effected batchwise. If desired, however, the fluorination can be effected as a continuous operation wherein unreacted components are recycled and the desired reaction products are removed as formed.

I claim:
1. Process for preparing at least one member of the class consisting of compounds having the formula $RM(O)F_2$ and compounds having the formula $RMF_4$, wherein R is an organic radical free of Zerewitinoff hydrogen selected from the class consisting of alkyl, haloalkyl, alkenyl, cycloalkyl, halocycloalkyl, aryl and haloaryl, and M is selected from the class consisting of phosphorus, arsenic, and antimony, which comprises reacting sulfur tetrafluoride with an acid of the general formula $RM(O)(OH)_2$, in which R and M have the same significance as above.

2. Process for preparing at least one member of the class consisting of compounds having the formula $RM(O)F_2$ and compounds having the formula $RMF_4$, wherein R is a radical free of Zerewitinoff hydrogen selected from the class consisting of hydrocarbon and halohydrocarbon of not more than twelve carbon atoms, and M is selected from the class consisting of phosphorus, arsenic, and antimony, which comprises reacting an acid of the formula $RM(O)(OH)_2$ in which R and M have the same significance as above, with sulfur tetrafluoride.

3. Process for preparing compounds of the formula $RMF_4$, wherein R is an organic radical free of Zerewitinoff hydrogen selected from the group consisting of alkyl, haloalkyl, alkenyl, cycloalkyl, halocycloalkyl, aryl and haloaryl, and M is selected from the class consisting of phosphorus, arsenic, and antimony, which comprises reacting sulfur tertafluoride with an oxyfluoride of the formula $RM(O)F_2$, wherein R and M have the same significance as above.

4. Organic arsenic oxyfluorides having the formula $RAs(O)F_2$, wherein R is an organic radical free of Zerewitinoff hydrogen selected from the class consisting of alkyl, haloalkyl, alkenyl, cycloalkyl, halocycloalkyl, aryl and haloaryl.

5. Organic arsenic tetrafluorides having the formula $RAsF_4$, wherein R is an organic radical free of Zerewitinoff hydrogen selected from the class consisting of alkyl, haloalkyl, alkenyl, cycloalkyl, halocycloalkyl, aryl and haloaryl.

6. Organic antimony oxyfluorides having the formula $RSb(O)F_2$, wherein R is an organic radical free of Zerewitinoff hydrogen selected from the class consisting of alkyl, haloalkyl, alkenyl, cycloalkyl, halocycloalkyl, aryl and haloaryl.

7. Organic antimony tetrafluorides having the formula $RSbF_4$, wherein R is an organic radical free of Zerewitinoff hydrogen selected from the class consisting of alkyl, haloalkyl, alkenyl, cycloalkyl, halocycloalkyl, aryl and haloaryl.

References Cited in the file of this patent

UNITED STATES PATENTS

| | | |
|---|---|---|
| 1,917,207 | Kaufman | July 4, 1933 |
| 2,599,375 | Drake et al. | June 3, 1952 |

OTHER REFERENCES

Journal of Organic Chemistry, vol. 14, 1949, pp. 429 to 432.

Chem. Abstracts, vol. 46, page 1482.

UNITED STATES PATENT OFFICE
CERTIFICATE OF CORRECTION

Patent No. 2,950,306            August 23, 1960

William Channing Smith

It is hereby certified that error appears in the printed specification of the above numbered patent requiring correction and that the said Letters Patent should read as corrected below.

Column 2, line 63, for "$RM'(O)_xF_{4-x}$" read -- $RM'(O)_xF_{4-2x}$ --; column 6, line 1, for "tertafluoride" read -- tetrafluoride --.

Signed and sealed this 4th day of April 1961.

(SEAL)

Attest:    ERNEST W. SWIDER

Attesting Officer                   ARTHUR W. CROCKER
                                        Acting Commissioner of Patents